(12) United States Patent
Fisher

(10) Patent No.: US 6,918,243 B2
(45) Date of Patent: Jul. 19, 2005

(54) BI-PROPELLANT INJECTOR WITH FLAME-HOLDING ZONE IGNITER

(75) Inventor: Steven C. Fisher, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 109 days.

(21) Appl. No.: 10/440,854

(22) Filed: May 19, 2003

(65) Prior Publication Data

US 2004/0231318 A1 Nov. 25, 2004

(51) Int. Cl.[7] .............................. C06D 5/00; F02K 5/00; F23R 5/00
(52) U.S. Cl. ............................. 60/211; 60/212; 60/213
(58) Field of Search .................... 60/205, 210, 211, 60/212, 213, 257, 258, 259, 39.826, 39.821, 750, 39.286

(56) References Cited

U.S. PATENT DOCUMENTS

| | | | | |
|---|---|---|---|---|
| 2,523,656 A | * | 9/1950 | Goddard | 60/258 |
| 3,048,966 A | * | 8/1962 | Feraud et al. | 60/216 |
| 3,085,393 A | * | 4/1963 | Hamlin, Jr. | 60/211 |
| 3,137,130 A | * | 6/1964 | Tinkelenberg | 60/258 |
| 3,178,884 A | * | 4/1965 | Boardman, Jr. | 60/247 |
| 3,266,241 A | * | 8/1966 | Jennings | 60/258 |
| 3,272,770 A | * | 9/1966 | Lundahl | 60/204 |
| 3,334,490 A | * | 8/1967 | Hoeptner et al. | 60/258 |
| 3,350,886 A | * | 11/1967 | Ferand et al. | 60/204 |
| 3,446,924 A | * | 5/1969 | Giambertoni | 200/38 BA |
| 3,490,238 A | * | 1/1970 | Capps et al. | 60/258 |
| 3,570,249 A | * | 3/1971 | Baum et al. | 60/259 |
| 3,577,735 A | * | 5/1971 | Schmidt | 60/207 |
| 3,662,547 A | * | 5/1972 | Paine et al. | 60/258 |
| 3,662,960 A | * | 5/1972 | Mitchell et al. | 239/400 |
| 3,691,769 A | * | 9/1972 | Keilbach et al. | 60/217 |
| 3,695,041 A | * | 10/1972 | Eggers et al. | 60/264 |

(Continued)

Primary Examiner—Cheryl Tyler
Assistant Examiner—William H. Rodriguez (57) ABSTRACT

A bi-propellant injector (66) includes a first injector element (68) and a second injector element (70) injecting a first propellant (69) and a second propellant (71), respectively, into a combustion chamber (53). A flame-holding zone igniter (74) is adjacent to and ignites recirculation of at least a portion of the first propellant (69) and at least a portion of the second propellant (71) within a flame-holding zone (76).

32 Claims, 5 Drawing Sheets

U.S. PATENT DOCUMENTS

| | | | | |
|---|---|---|---|---|
| 3,699,772 A | * | 10/1972 | Elverum, Jr. | 60/258 |
| 3,780,952 A | * | 12/1973 | Huang | 239/424.5 |
| 3,882,676 A | * | 5/1975 | Schmidt | 60/245 |
| 3,903,693 A | * | 9/1975 | Fox | 60/200.1 |
| 3,910,037 A | * | 10/1975 | Salkeld | 60/250 |
| 3,926,169 A | | 12/1975 | Leshner et al. | |
| 3,943,706 A | * | 3/1976 | Grafwallner et al. | 60/204 |
| 4,073,138 A | * | 2/1978 | Beichel | 60/245 |
| 4,171,615 A | * | 10/1979 | Stewart et al. | 376/318 |
| 4,214,439 A | * | 7/1980 | Browning et al. | 60/216 |
| 4,220,001 A | * | 9/1980 | Beichel | 60/225 |
| 4,583,362 A | * | 4/1986 | Wagner | 60/259 |
| 4,589,253 A | * | 5/1986 | Wagner | 60/204 |
| 4,621,492 A | * | 11/1986 | von Pragenau | 60/258 |
| 4,707,982 A | | 11/1987 | Wagner | |
| 4,721,081 A | | 1/1988 | Krauja et al. | |
| 4,771,599 A | * | 9/1988 | Brown et al. | 60/258 |
| 4,771,600 A | * | 9/1988 | Limerick et al. | 60/258 |
| 4,771,601 A | * | 9/1988 | Spies | 60/259 |
| 4,777,794 A | * | 10/1988 | Nielsen | 60/211 |
| 4,801,092 A | * | 1/1989 | Webber et al. | 239/418 |
| 4,879,874 A | * | 11/1989 | Koyari et al. | 60/259 |
| 4,894,986 A | * | 1/1990 | Etheridge | 60/258 |
| 4,912,925 A | * | 4/1990 | Foust | 60/259 |
| 4,998,410 A | * | 3/1991 | Martinez-Leon et al. | 60/259 |
| 5,025,623 A | * | 6/1991 | Hirakoso et al. | 60/257 |
| 5,054,287 A | * | 10/1991 | Schneider | 60/240 |
| 5,109,669 A | * | 5/1992 | Morris et al. | 60/39.821 |
| 5,267,437 A | * | 12/1993 | Foust | 60/206 |
| 5,404,715 A | * | 4/1995 | Vuillamy et al. | 60/257 |
| 5,444,973 A | * | 8/1995 | Limerick et al. | 60/204 |
| 5,551,230 A | * | 9/1996 | Meng | 60/259 |
| 5,603,213 A | * | 2/1997 | Sion et al. | 60/258 |
| 5,647,201 A | * | 7/1997 | Hook et al. | 60/258 |
| 5,660,039 A | * | 8/1997 | Sion et al. | 60/258 |
| 5,715,788 A | | 2/1998 | Tarr et al. | |
| 5,873,240 A | * | 2/1999 | Bussing et al. | 60/207 |
| 5,873,241 A | * | 2/1999 | Foust | 60/259 |
| 5,918,460 A | * | 7/1999 | Connell et al. | 60/257 |
| 5,941,062 A | * | 8/1999 | Koppel et al. | 60/247 |
| 5,980,782 A | | 11/1999 | Hershkowitz et al. | |
| 6,050,085 A | * | 4/2000 | Mayer | 60/211 |
| 6,082,098 A | * | 7/2000 | Park et al. | 60/258 |
| 6,226,980 B1 | * | 5/2001 | Katorgin et al. | 60/258 |
| 6,244,040 B1 | * | 6/2001 | Adzhian et al. | 60/258 |
| 6,244,041 B1 | * | 6/2001 | Vasin et al. | 60/258 |
| 6,253,539 B1 | * | 7/2001 | Farhangi et al. | 60/211 |
| 6,269,630 B1 | * | 8/2001 | Kreiner et al. | 60/258 |
| 6,272,847 B1 | * | 8/2001 | Dietrich | 60/258 |
| 6,381,949 B1 | * | 5/2002 | Kreiner et al. | 60/258 |
| 6,469,424 B1 | | 10/2002 | Marable | |
| 6,470,670 B2 | * | 10/2002 | Maeding | 60/259 |
| 6,505,463 B2 | * | 1/2003 | Kruse et al. | 60/218 |
| 6,536,208 B1 | * | 3/2003 | Kretschmer | 60/258 |
| 6,568,171 B2 | * | 5/2003 | Bulman | 60/224 |
| 6,655,127 B2 | * | 12/2003 | Kruse et al. | 60/259 |
| 6,769,242 B1 | * | 8/2004 | Balepin | 60/204 |
| 2001/0015063 A1 | * | 8/2001 | Maeding | 60/258 |
| 2003/0046923 A1 | * | 3/2003 | Dressler et al. | 60/258 |
| 2004/0148923 A1 | * | 8/2004 | Hewitt | 60/257 |
| 2004/0177603 A1 | * | 9/2004 | Hewitt | 60/205 |

* cited by examiner (Prior Art)
FIG. 1

BI-PROPELLANT INJECTOR WITH FLAME-HOLDING ZONE IGNITER

TECHNICAL FIELD

The present invention relates generally to rocket engine injectors and ignition systems, and more particularly, to systems for igniting a propellant mixture within a favorable ignition zone of a bi-propellant injector as well as a method of operating a bi-propellant injector system.

BACKGROUND OF THE INVENTION

Liquid propellant rocket engines, commonly utilize bi-propellant coaxial injection elements or the like for injection and combustion of oxidizer and fuel in a combustion chamber. Hundreds of injector elements may exist in supplying propellant to a single combustion chamber.

Figure 1:
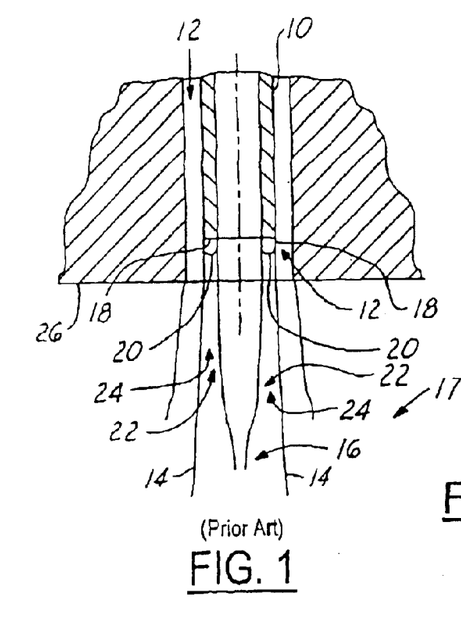
FIG. 1 is a close-up cross-sectional view of a traditional coaxial injector element with a flame-holding zone in accordance with an embodiment of the present invention.

Referring now to FIG. 1, a close-up cross-sectional view of a traditional coaxial injector element with a flame-holding zone is shown. Coaxial elements typically inject a first propellant through a central post 10 and a second propellant through a surrounding annulus 12. The propellants being oxidizer and fuel. Shear flow created at a boundary 14 between the fuel and the oxidizer is utilized to atomize and mix the propellants prior to combustion in a reaction zone 16 of a combustion chamber 17.

A mixture of oxidizer and fuel exists in the recirculating wake in an area at the end of a post tip 18 of the central post 10, which is forms a flame-holding zone 20. The flame-holding zone, at the end of the post 10, has low axial velocities, recirculating flow, and a very ignitable mixture ratio. Once propellants within this zone are ignited, which can be difficult, the combustion system can be operated at mixture ratios much lower than the well-mixed flammability limit of the propellants.

When oxidizer is flowing through the central post 10 and fuel is flowing through the surrounding annulus 12 a central zone 22 of mixture ratios (oxidizer to fuel) exist ranging from infinity near flow of the oxidizer and approaching zero near the flow of fuel or boundary 14. The central zone 22 is surrounded by an annular zone 24 having a low mixture ratio, approaching zero. The opposite exists when fuel is flowing through the central post 10 and oxidizer is flowing through the surrounding annulus 12.

An ignition system (not shown) is typically coupled to the combustion chamber and may include one or more ignition sources (i.e. spark igniters) that are located downstream of an injector face 25, which are used in igniting the mixture of propellants within the combustion chamber 17. Ignition of the flame-holding zone 20 is important for combustion zone stability and essential for combustors that operate at overall mixture ratios either lower or higher than the well mixed flammability limits for the propellant combination. In order to ignite the flame-holding zone 20 ignition from an ignition source needs to propagate from the source across the annulus fuel flow 12 to the flame-holding zone 20. When multiple elements exist the ignition may have to propagate through multiple zones having high and low mixture ratios to ignite each corresponding flame-holding zone.

In addition to the existing high and low mixture ratios (outside of flammability limits), which are difficult to propagate combustion therethrough, propellant injection velocities are typically high near the injector face, sometimes exceeding flame propagation speeds. The combination of high and low mixture ratios and high propellant velocities, results in difficult to control and unreliable ignition propagation.

In order to ignite the flame-holding zone, from a location downstream of the injector face, propellant injection flow rates must be slowed down or reversed. A pressure surge or "pop" in the combustion chamber accomplishes this and allows the combustion process to propagate up to the flame-holding zone 20 at the tip of the central post 10. A pop occurs from ignition of an undesirable accumulation of unburned propellants within the combustion chamber 17. Once these accumulated propellants in the combustion chamber 17 are ignited, a pressure surge and a temperature spike are created. The pressure surge slows down and sometimes even reverses the injector flow and allows propagation through the slower moving propellants to the flame-holding zone 20. Under normal operating conditions, once the flame-holding zone 20 is ignited it remains ignited.

These temperature spikes and pops over time cause degradation of turbine components due to the higher operating temperatures and thermal stresses. Turbine life is directly related to operational gas temperatures.

Figures 2, 12:
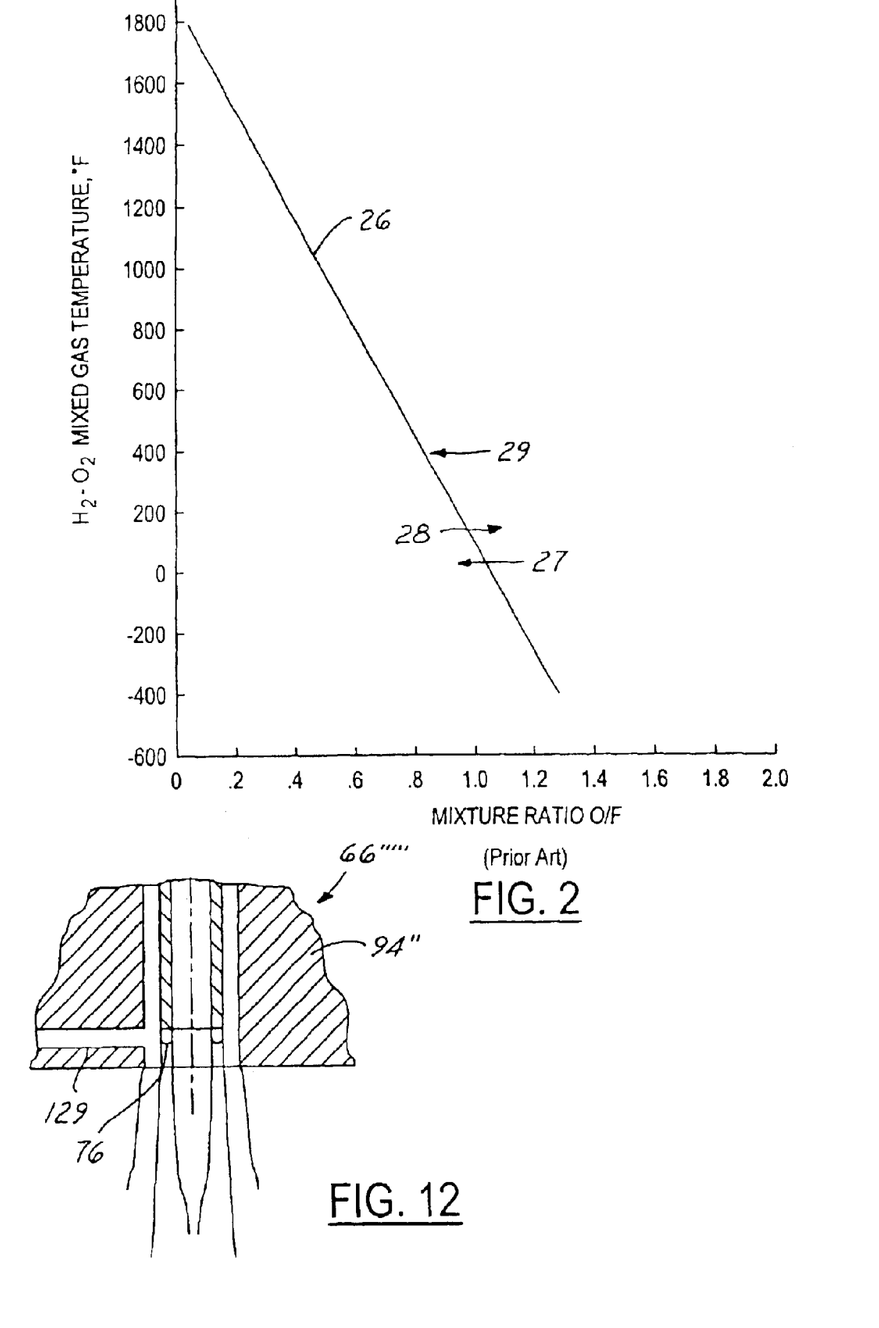
FIG. 2 is a flammability plot of mixed oxidizer/fuel temperature versus mixture ratio for a traditional bi-propellant coaxial injector.
FIG. 12 is a close-up cross-sectional view of a bi-propellant coaxial injector element incorporating hypergol ignition and utilizing a hypergol passage within an injector faceplate in accordance with another embodiment of the present invention.

Referring now to FIG. 2, a flammability plot of mixed oxidizer/fuel temperature versus mixture ratio is shown for a traditional bi-propellant coaxial injector. Curve 26 represents a border between a nonflammable region 27 and a flammable region 28. Typical turbine drive combustors for liquid rocket engines operate at very low mixture ratios. These low mixture ratios can sometimes be lower than well-mixed flammability limits for a particular propellant combination. This low mixture provides low temperature gases to drive the turbine. Generally, when mixture ratios are increased sufficiently to propagate combustion from the ignition source to ignite the flame-holding zone, gas temperatures are too high for turbine survivability during steady state operation. Typically, operating in temperatures above normal operating conditions or steady state operation, depending upon the turbine and the operating conditions, is undesirable due to material strengths at elevated temperatures and thermal gradients that cause expansion and strain on engine components, thereby reducing engine operating life.

For example, a preburner design used on a space shuttle main engine may operate within a temperature range of 1000° F. to 1500° F. with a mixture ratio of 0.6 to 0.9 of oxygen to fuel. The flammability mixture ratio limit for $O_2/H_2$ is approximately 1.2 of oxygen to fuel at −200° F., which has a corresponding and resulting combustion gas temperature of 2200° F. that is too high for survivability of the turbine.

It has been suggested to increase reliability of flame-holding zone ignition is to use a higher mixture ratio during ignition and then reduce the mixture ratio following successful ignition for mainstage/steady state operation. Unfortunately, this results in undesirable temperature during start, which still leads to reduced turbine life.

It is therefore desirable for increased turbine operating life to provide a bi-propellant injector that provides ignition of the flame-holding zone without the typical accompanying requirements and associated disadvantages of high mixture ratio and resulting high turbine temperatures.

SUMMARY OF THE INVENTION

The present invention provides systems for igniting a propellant mixture within a flame-holding zone of a bi-propellant injector as well as a method of operating a bi-propellant injector system. A bi-propellant injector is provided and includes a first injector element and a second injector element injecting a first propellant and a second propellant, respectively, into a combustion chamber. A flame-holding zone ignition source is adjacent to and ignites recirculation of at least a portion of the first propellant and at least a portion of the second propellant within a flame-holding zone.

The present invention has several advantages over existing bi-propellant injector ignition systems. One advantage is that it ignites propellant mixtures that exist within a flame-holding zone without requiring high overall mixture ratios or pressure surges. In so doing, the present invention aids in minimizing temperature spikes within a combustion chamber lowers operating temperature of the combustion chamber, which results in increased turbine operational life.

Another advantage of the present invention is that it is versatile since it provides multiple bi-propellant injector configurations to satisfy various operating applications and conditions.

Furthermore, the present invention provides smooth reliable ignition of various propellant combinations, thereby allowing the present invention to be utilized in various and rocket engine applications.

The present invention itself, together with further objects and attendant advantages, will be best understood by reference to the following detailed description, taken in conjunction with the accompanying drawings.

DETAILED DESCRIPTION OF THE PREFERRED EMBODIMENT

In each of the following figures, the same reference numerals are used to refer to the same components. While the present invention is described with respect to systems for igniting an oxidizer-fuel mixture within a flame-holding zone of a bi-propellant coaxial injector as well as a method of operating a bi-propellant coaxial injector system, the present invention may be adapted for various applications. The present invention may be applied to gas turbine combustion systems or to other engines having propellant/fuel injectors with a flame-holding zone or similar characteristics therein.

In the following description, various operating parameters and components are described for one constructed embodiment. These specific parameters and components are included as examples and are not meant to be limiting.

The present invention is directed towards a bi-propellant injector having a first injector element injecting a first propellant and a second injector element injecting a second propellant into a combustion chamber. A flame-holding zone igniter is adjacent to and ignites recirculation of the first propellant and the second propellant within a flame-holding zone. This is best seen and described in further detail in the embodiments corresponding with FIGS. 5–9 and 11–12.

Figure 3:
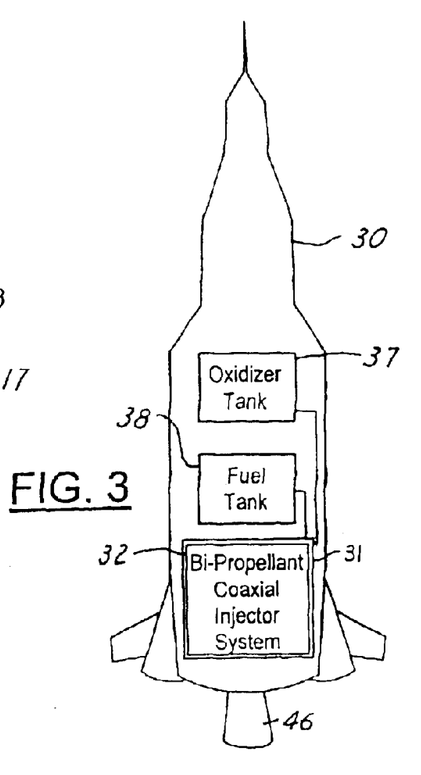
FIG. 3 is a block-diagrammatic view of a rocket incorporating a bi-propellant coaxial injector system in accordance with an embodiment of the present invention.

Referring now to FIG. 3, a perspective view of a rocket 30 having a rocket engine 31 incorporating a bi-propellant coaxial injector system 32 in accordance with an embodiment of the present invention is shown. The rocket 30 is shown for example purposes only to illustrate use of the present invention within a particular vehicle, by no means is the present invention limited to use within a vehicle or a rocket. The rocket 30 may have multiple operating stages corresponding to multiple segments of the rocket 30, as known in the art. Each stage may have a fuel storage unit and one or more engines for flight.

Figure 4:
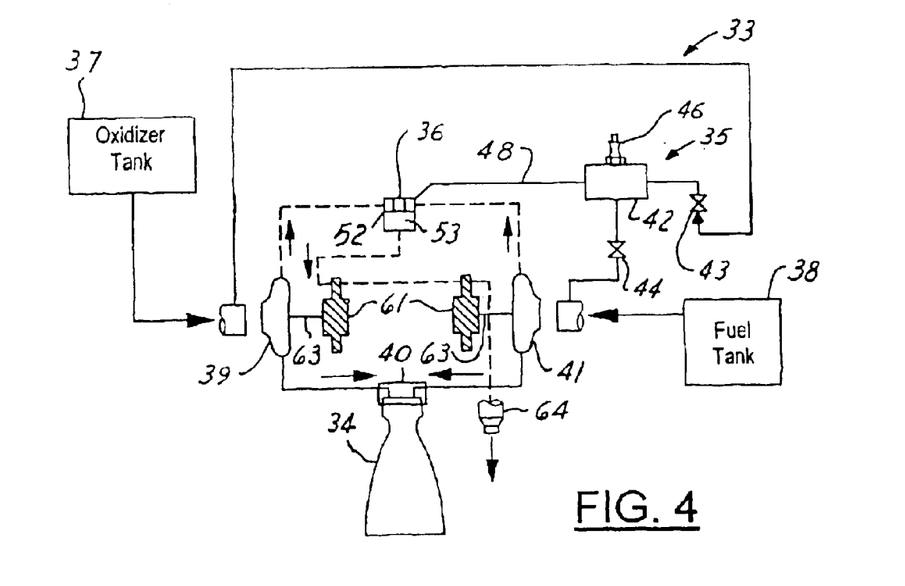
FIG. 4 is a schematic and block diagrammatic view of a propellant supply circuit for a turbopump liquid rocket engine incorporating the bi-propellant coaxial injector system in accordance with an embodiment of the present invention.

Referring now also to FIG. 4, a schematic and block diagrammatic view of a propellant supply circuit 33 for the thrust chamber 34 incorporating a combustion wave ignition system 35 and the turbine drive injector system 36 in accordance with an embodiment of the present invention is shown. In general the rocket 30 includes a first propellant tank and a second propellant tank, such as an oxidizer tank 37 and a fuel tank 38. A first pump 39 is used to pump oxidizer from the oxidizer tank 37 to turbine drive injector system 36 and a main chamber injector system 40. Likewise, a second pump 41 is used to pump fuel from the fuel tank 38 to the turbine drive injector system 36 and the main chamber injector system 40.

Figures 5, 6:
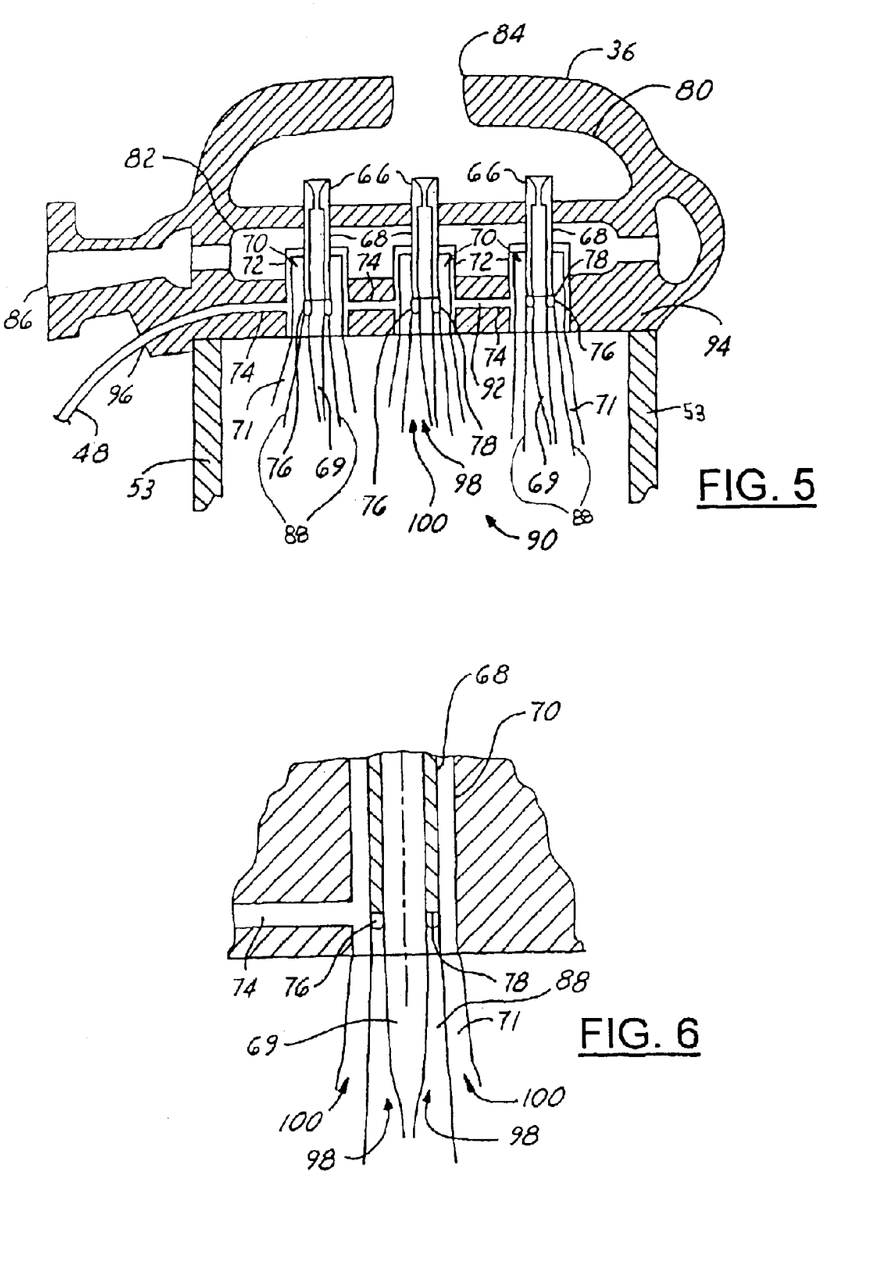
FIG. 5 is a cross-sectional view of the bi-propellant injector system of FIG. 4 incorporating bi-propellant coaxial injector elements in accordance with an embodiment of the present invention.
FIG. 6 is a close-up cross-sectional view of bi-propellant coaxial injector elements incorporating a combustion wave ignition system and utilizing a combustion wave passage within an injector faceplate in accordance with an embodiment of the present invention.

Oxidizer flow to a combustion wave-mixing chamber 42 is controlled by a mixer oxidizer valve 43. Fuel flow to the combustion wave-mixing chamber 42 is controlled by a mixer fuel valve 44. Once both propellants are mixed and flowed throughout the ignition system combustion wave line 48 to individual coaxial injector elements 68 and 70, contained within the injector system 36 and are best seen in FIG. 5, the mixer valves are closed to preclude back flow towards and into the propellant tanks 37 and 38 and a spark is provided by the spark plug 46 to ignite the premixed propellants. A resulting combustion wave travels down a combustion wave tube 48 to flame-holding zones 76 of the injector elements 68 and 70 in the turbine drive injector system 36. The combustion wave is the ignition source that ignites the flame-holding zones 76. The ignited propellants provide energy to power the turbopumps 39 and 41, which in turn supply the oxidizer and fuel to turbine drive injector 36 and the thrust chamber injector 40 and chamber 34.

The turbine drive injector system 36 provides a system for injection of the oxidizer and fuel into the turbine drive combustion chamber 53. Supply of the oxidizer and the fuel to a premix chamber 42 is controlled through use of the oxidizer valve 43 and a fuel valve 44. A combustion wave tube 48 is coupled between the premix chamber 42 and the turbine drive injector 36. The igniter 46 is coupled to the premix chamber 42 and is used to ignite propellants within the premix chamber 42. The igniter 46 may be a spark igniter or other igniter known in the art.

In operation, the valves 43 and 44 are opened to allow oxidizer and fuel to enter and fill the premix chamber 42 and the combustion wave tube 48. Upon filling of the premix chamber 42 and the wave tube 48 then oxidizer and the fuel in the premix chamber 42 are ignited by the igniter 46. Ignited oxidizer and fuel within the premix chamber 42 sends a combustion wave through the combustion wave tube 48. Ignition of the propellants travels from the premix chamber 42 through the wave tube 48 into the turbine drive injector 36 to ignite the individual flame-holding zones of the coaxial injector elements in the turbine drive injector system 36. Ignition of the individual flame-holding zones provides the ignition source for the main propellants to combustion the turbine drive combustion chamber 53.

Ignited propellants within the combustion chamber 53 supply power for rotating turbines 61. Rotational energy is transferred from the turbines 61 to the pumps 39 and 41 to pump oxidizer and fuel into the main injector 40 and thrust chamber 34. After passing through the turbines the combustion products are dumped overboard through a turbine exhaust 64.

Referring now to FIGS. 5 and 6, a cross-sectional view of the turbine drive injector 36 and a close-up cross-sectional view of bi-propellant coaxial injectors 66 in accordance with an embodiment of the present invention is shown. The injector 36 may include any number of bi-propellant coaxial injectors 66 having bi-propellant injector zones 67 corresponding to each injector 66. Note that although the present invention is described with respect to and utilizes a bi-propellant coaxial injector, the present invention may be applied to any other type of injector element that also has a flame-holding zone.

Each injector 66 has a first injector element or central post 68 that injects a first propellant 69, such as oxidizer, into a combustion chamber and a second injector element or annulus 70 that injects a second propellant 71, such as fuel, into the secondary chamber 42. Each injector element 68 protrudes within cylindrical sleeves 72 that are open to the turbine drive combustion chamber 53. A flame-holding zone combustion wave port 74 is adjacent to and ignites recirculation of the propellants 69 and 71 within flame-holding zones 76.

The flame-holding zones 76 refer to areas adjacent to and external from ends of the central posts 68, within the sleeves 72, where a mixture of oxidizer and fuel exists in the wake of the central post, during steady state operation. The present invention provides several techniques for igniting propellants within these flame-holding zones; the embodiment of FIG. 5 is an illustration of one of these techniques.

As is shown in the embodiment of FIG. 5, the first injector element 68 is a central post and the second injector element 70 is a surrounding annulus that surrounds the first injector element 68. The first injector elements 68 have tips 78 that are adjacent to flame-holding zones 76. Although the first injector element 68 is in the form of a central post and the second injector element 70 is in the form of an annulus they be in some other form known in the art.

In operation, oxidizer enters a first inlet manifold 80 and fuel enters a second inlet manifold 82 via a first port 84 and a second port 86, respectively. The oxidizer 69 and the fuel 71 are injected into the combustion chamber 53 through central post 68 and surrounding annulus 70. Of course, injector system 36 may be modified such that fuel enters through the central post 68 and oxidizer enters through the surrounding annulus 70. Shear flow created at a boundary 88 between the fuel and the oxidizer is utilized to atomize and mix the propellants 69 and 71 prior to combustion in a combustion zone 90 of the combustion chamber 53.

To ignite the flame-holding zones 76 the combustion wave travels through the premix of oxidizer and fuel in the combustion wave tube 48 and the combustion wave passages 74 in an injector faceplate 94 and exit at a location that is in close proximity to the tips 78. The passages 74 are within the injector faceplate 94 and are coupled to the combustion wave tube 48 at a combustion wave port 96. Ignited premix propellants within the combustion wave tube 48 ignite propellants within the passageways 74, which in turn ignite propellants within the flame-holding zones 76.

Note, the premix chamber 42, the wave tube 48, and the wave passages 74 may be purged by filling each of them with an inert gas, such as nitrogen before supplying of the propellants 69 and 71 or may be purged using other techniques known in the art.

Although, there exists a high mixture ratio that approaches infinity in a central zone 98, which is surrounded by an annular zone 100 having a low mixture ratio approaching zero, the present invention is able to overcome difficulty in igniting propellants within the flame-holding zones 76. Due to the close proximity and direct ignition of recirculating propellants in the flame-holding zones 76, the present invention also provides smooth ignition of propellants within the combustion chamber 53 without large temperature increases or pressure surges.

Figure 7:
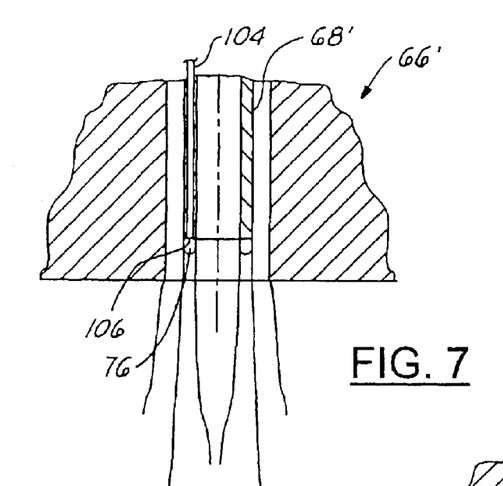
FIG. 7 is a close-up cross-sectional view of a bi-propellant coaxial injector element incorporating a combustion wave ignition system and utilizing a combustion wave passage within a central post in accordance with an embodiment of the present invention.

Referring now to FIG. 7, a close-up cross-sectional view of a bi-propellant coaxial injector 66' having combustion wave ignition system and utilizing a combustion wave passage 104 within a central post 68' in accordance with an embodiment of the present invention is shown. The bi-propellant injector 66' is similar to the bi-propellant injectors 66, in that both use a combustion wave passage to inject and direct combustion wave energy within close proximity of a flame-holding zone. On the other hand, the bi-propellant injector 66' is different in that the combustion wave passage 104 is routed within the central post 68' rather than within an injector faceplate, such as faceplate 94.

Also, tip 106 of the passage 104 is in direct contact with the flame-holding zone 76. In being in direct contact, premixed propellants are not injected across a surrounding annulus but rather are injected directly in the flame-holding zone 76, thus, potentially decreasing penetration requirements for injection of the combustion wave energy, the combustion energy does not need to overcome flow rate of the second propellant 71. Direct contact and injection of the combustion wave energy, may also minimize operating temperature during ignition of the flame-holding zone 76, due to higher available combustion wave energy and thus lower injector overall mixture ratio requirement of propellants being injected into the combustion chamber.

Figure 8:
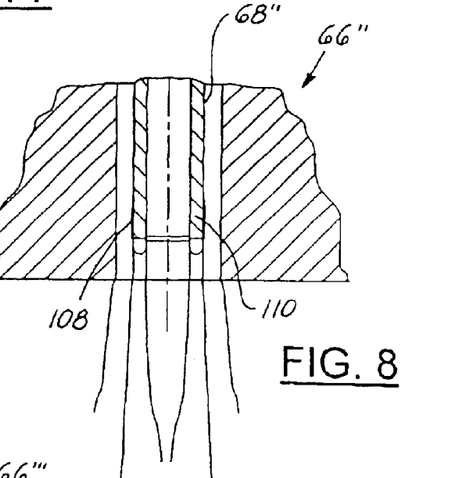
FIG. 8 is a close-up cross-sectional view of a bi-propellant coaxial injector element utilizing a catalytic coating in accordance with another embodiment of the present invention.

Referring now to FIG. 8, a close-up cross-sectional view of a bi-propellant coaxial injector 66" utilizing a catalytic coating 108 in accordance with another embodiment of the present invention is shown. Instead of utilizing a combustive wave passage, such as passage 92, a catalytic coating 108 is used and resides over an end portion 110 of the central post 68". A catalytic reaction is initiated as one of the propellants flows across the catalytic surface. The partially reacted propellant mixes with the other propellant in the mixing zone and combustion of the two propellants continues. In the flame-holding zone the catalytic coating 108 may be of various type known in the art.

Figure 9:
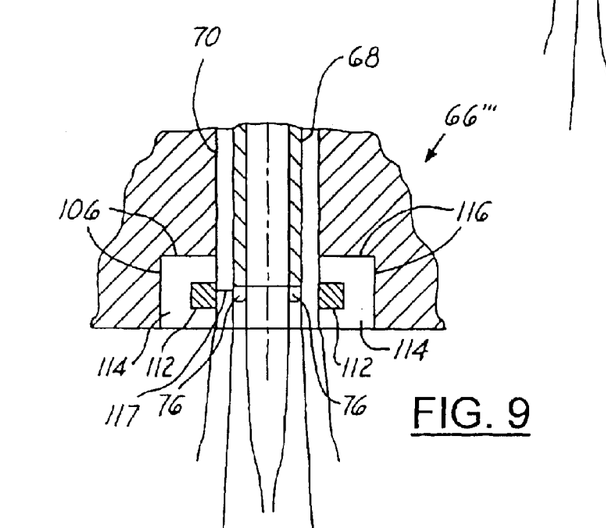
FIG. 9 is a close-up cross-sectional view of a bi-propellant coaxial injector element utilizing spark ignition in accordance with another embodiment of the present invention.

Referring now to FIG. 9, a close-up cross-sectional view of a bi-propellant coaxial injector 66''' utilizing direct spark ignition of the flame-holding zone in accordance with another embodiment of the present invention is shown. Electrodes in each injector element 112 are coupled to an injector faceplate 94' and have a different voltage potential than that of the central post 68. Insulation areas 114 surround the electrodes 112 on faceplate sides 116 of the electrodes 112, to isolate the electrodes 112 from the faceplate 94' and prevent electrical conduction therebetween. The electrodes 112 act as a flame-holding zone igniter to ignite propellants 69 and 71 within the flame-holding zone 76. A voltage potential is created between the electrodes 112 and the central post 68 such that a spark, represented by designator 117, is generated across surrounding annulus 70 to ignite the flame-holding zone 76.

Figure 10:
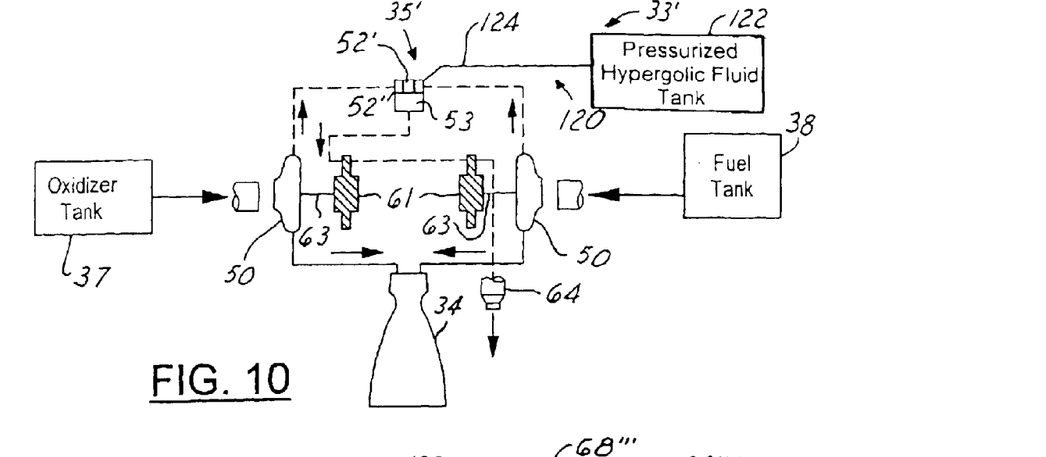
FIG. 10 is a schematic and block diagrammatic view of a propellant supply circuit for a turbine engine incorporating a bi-propellant coaxial injector system with hypergol ignition in accordance with another embodiment of the present invention.

Referring now to FIG. 10, a schematic and block diagrammatic view of a propellant supply circuit 33' for a liquid rocket engine incorporating a bi-propellant turbine drive coaxial injector system 35' with hypergol ignition system in accordance with another embodiment of the present invention is shown. The embodiment of FIG. 10 is similar to that of FIG. 4, but a hypergol fluid is supplied to the turbine drive injector 36 rather than a combustion wave. The supply circuit 33' includes a hypergol injector circuit 120 having a pressurized hypergol fluid tank 122. The hypergol tank 122 allows flow of hypergol fluid through a hypergol fluid tube 124 to a turbine drive injector 36'.

Figure 11:
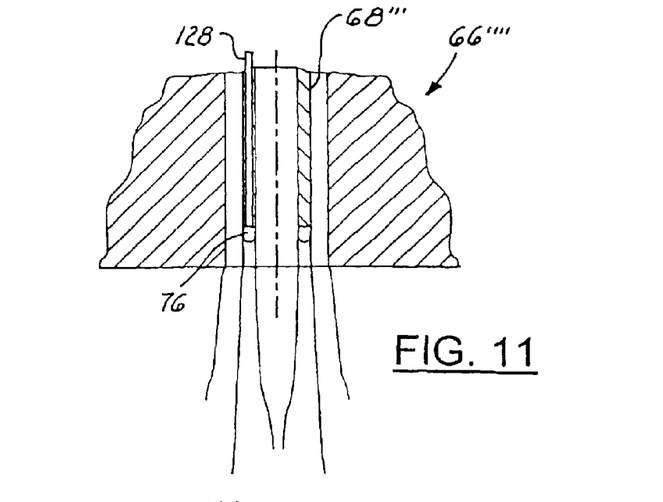
FIG. 11 is a close-up cross-sectional view of a bi-propellant coaxial injector element incorporating hypergol ignition and utilizing a hypergol passage within a central post of the injector element in accordance with another embodiment of the present invention.

Referring now to FIG. 11, a close-up cross-sectional view of a bi-propellant coaxial injector 66"" incorporating hypergol ignition and utilizing a hypergol fluid passage 128 within a central post 68 in accordance with another embodiment of the present invention is shown. The hypergol fluid passage 128 is incorporated within the central post 68, similar to the passage 104 of FIG. 7. The hypergol fluid passage 128 performs as a flame-holding zone igniter by injecting hypergol fluid into the flame-holding zone 76. The hypergol fluid reacts with recirculating propellants within the flame-holding zone 76 and causes ignition therein. The hypergol fluid may be of various type known in the art, including triethylaluminum, triethylboron, and various fluorines.

Referring now to FIG. 12, is a close-up cross-sectional view of a bi-propellant coaxial injector element 66""" incorporating hypergol ignition and utilizing a hypergol passage 129 within an injector faceplate 94" in accordance with another embodiment of the present invention. Hypergol passage 129 is similar to that of passage 128, of FIG. 11, in that it allows hypergol fluid to be injected within the flame-holding zone 76.

Figure 13:
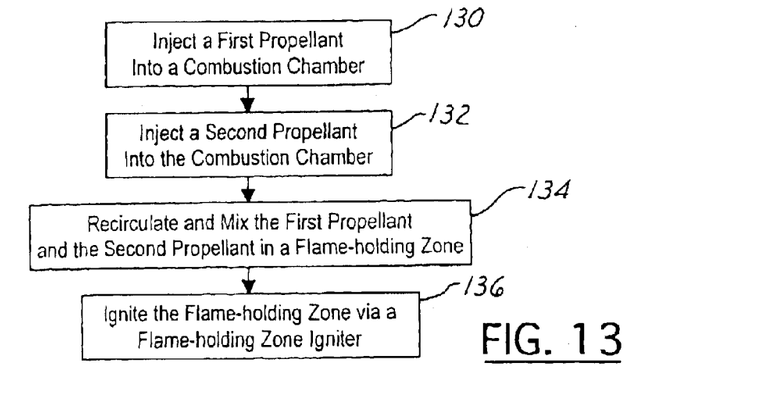
FIG. 13 is a logic flow diagram illustrating a method of operating a bi-propellant fuel injector system in accordance with an embodiment of the present invention.

Referring now to FIG. 13, a logic flow diagram illustrating a method of operating a bi-propellant fuel injector system in accordance with an embodiment of the present invention is shown.

In step 130, a first propellant is injected into a combustion chamber. In step 132, a second propellant is injected into the combustion chamber. The first propellants may be oxidizer or fuel.

Note, depending on the ignition system and propellant combination being utilized, sequence of events will vary. Since a combustion wave ignition system provides a "single" pulse, both propellants are flowing before spark is initiated. On the other hand, for a spark ignition system, spark is initiated before flow of propellants.

In step 134, the first propellant and the second propellant are recirculated and mixed within a flame-holding zone in the combustion chamber.

In step 136, the flame-holding zone is ignited via a flame-holding zone igniter of a bi-propellant injector system, such as one of the above stated igniters and injector systems.

The above-described steps in the above methods are meant to be an illustrative example; the steps may be performed sequentially, synchronously, continuously, or in a different order depending upon the application. Also, as stated the steps may be modified depending upon ignition system and propellant combinations utilized.

The present invention provides several ignition sources of varying type. The ignition sources ignite recirculating propellants within a flame-holding zone, which may be at a tip of an oxidizer post. The present invention provides smooth reliable ignition of coaxial element injector flows at various mixture ratios without a large temperature or pressure surge, resulting in increased turbine engine life.

The above-described apparatus and method, to one skilled in the art, is capable of being adapted for various applications and systems known in the art. The above-described invention can also be varied without deviating from the true scope of the invention.

What is claimed is:

1. A bi-propellant injector comprising:
   a first injector element injecting a first propellant into a combustion chamber;
   a second injector element at least partially surrounding said first injector element and injecting a second propellant into said combustion chamber; and
   a flame-holding zone igniter adjacent to and directly igniting recirculation of at least a portion of said first propellant and at least a portion of said second propellant within a flame-holding zone.

2. An injector as in claim 1 wherein said first injector element is a central post.

3. An injector as in claim 1 wherein said second injector element is a surrounding annulus that surrounds said first injector element.

4. An injector as in claim 3 wherein said first injector element has an oxidizer tip and wherein said flame-holding zone exists adjacent to said oxidizer tip.

5. An injector as in claim 1 wherein said flame-holding zone igniter is a combustion wave ignition system.

6. An injector as in claim 5 wherein said combustion wave ignition system is coupled to said first injector element and ignites at least a portion of said first propellant and at least a portion of said second propellant within said flame-holding zone.

7. An injector as in claim 5 wherein said combustion wave ignition system comprises at least one combustive wave tube with an injector end that is proximate to an oxidizer tip of said first injector element and ignites at least a portion of said first propellant and at least a portion of said second propellant within said flame-holding zone.

8. An injector as in claim 1 further comprising a combustion wave ignition passage adjacent to said flame-holding zone.

9. An injector as in claim 8 wherein said combustion wave Ignition passage extends within an injector faceplate.

10. An injector as in claim 1 wherein said flame-holding zone igniter in igniting recirculation of said first propellant and said second propellant within said flame-holding zone ignites said recirculation of said first propellant and said second propellant at a tip of said first injector element.

11. An injector as in claim 1 wherein flame-holding zone igniter is a combustion wave ignition system that has at least one ignited propellant and directs a combustion wave at and ignites said first propellant and said second propellant in said flame-holding zone.

12. A bi-propellant injector system comprising:
    a propellant injector circuit comprising:
        a first pump coupled to and supplying a first propellant from a first tank to a propellant injector manifold;
        a second pump coupled to and supplying a second propellant from a second tank to said propellant injector manifold; and
        a plurality of bi-propellant coaxial injectors coupled to said fuel injector manifold and comprising;
            a first injector element injecting said first propellant into a combustion chamber;
            a second injector element injecting said second propellant into said combustion chamber; and
            a flame-holding zone igniter directly igniting recirculation of at least a portion of said first propellant and at least a portion of said second propellant within a flame-holding zone.

13. A system as in claim 12 wherein said at least one flame-holding zone igniter is a combustion wave ignition system.

14. A method of operating a bi-propellant fuel injector system comprising:
    injecting a first propellant into a combustion chamber;
    injecting a second propellant into said combustion chamber;
    recirculating said first propellant and said second propellant within a flame-holding zone; and
    igniting recirculation of at least a portion of said first propellant and at least a portion of said second propellant within said flame-holding zone via a flame-holding zone igniter, said flame-holding zone igniter having at least one ignited propellant and directing a combustion wave at and directly igniting said first propellant and said second propellant in said flame-holding zone.

15. A bi-propellant injector for an engine having a manifold with multiple bi-propellant injector zones, corresponding to a plurality of bi-propellant injectors, said bi-propellant injector comprising:
    a first injector element injecting a first propellant into a combustion chamber;
    a second injector element injecting a second propellant into said combustion chamber; and
    a flame-holding zone igniter adjacent to and igniting recirculation of at least a portion of said first propellant and at least a portion of said second propellant within a flame-holding zone of the bi-propellant injector.

16. An injector as in claim 15 wherein said flame-holding zone igniter in igniting recirculation of said first propellant and said second propellant within said flame-holding zone ignites recirculation of said first propellant and said second propellant at a tip of said first injector element.

17. An injector as in claim 15 wherein said flame-holding zone igniter is a combustion wave ignition system that has at least one ignited propellant and directs a combustion wave at and ignites said first propellant and said second propellant in said flame-holding zone.

18. An injector as in claim 17 wherein said combustion wave ignition system comprises at least one combustive wave tube with an injector end that is proximate to an oxidizer tip of said first injector element and ignites at least a portion of said first propellant and at least a portion of said second propellant within said flame-holding zone.

19. An injector as in claim 15 wherein said second injector element is a surrounding annulus that surrounds said first injector element.

20. An injector as in claim 15 wherein said first injector element has an oxidizer tip and wherein said flame-holding zone exists adjacent to said oxidizer tip.

21. An injector as in claim 15 further comprising a combustion wave ignition passage adjacent to said flame-holding zone.

22. An injector as in claim 21 wherein said combustion wave ignition passage extends within an injector faceplate.

23. A bi-propellant injector system comprising:
    a plurality of bi-propellant coaxial injectors coupled to a fuel injector manifold and each of which comprising:
        a first injector element injecting said first propellant into a combustion chamber;
        a second injector element injecting said second propellant into said combustion chamber; and
        a flame-holding zone igniter igniting recirculation of at least a portion of said first propellant and at least a portion of said second propellant within a flame-holding zone.

24. A system as in claim 23 wherein said plurality of bi-propellant coaxial injectors comprise:
    a first bi-propellant coaxial injector coupled to a fuel injector manifold and comprising a first flame-holding zone igniter igniting recirculation of at least a portion of said first propellant and at least a portion of said second propellant within a first flame-holding zone; and
    a second bi-propellant coaxial injector coupled to said fuel injector manifold and comprising a second flame-holding zone igniter igniting recirculation of at least a portion of said first propellant and at least a portion of said second propellant within a second flame-holding zone.

25. An injector as in claim 23 wherein said flame-holding zone igniter in igniting recirculation of said first propellant and said second propellant within said flame-holding zone ignites recirculation of said first propellant and said second propellant at a tip of said first injector element.

26. An injector as in claim 23 wherein said flame-holding zone igniter is a combustion wave ignition system that has at last one ignited propellant and directs a combustion wave at and ignites said first propellant and said second propellant in said flame-holding zone.

27. An injector as in claim 26 wherein said combustion wave ignition system comprises at least one combustive wave tube with an injector end that is proximate to an oxidizer tip of said first injector element and ignites at least a portion of said first propellant and at least a portion of said second propellant within said flame-holding zone.

28. An injector as in claim 23 wherein said second injector element is a surrounding annulus that surrounds said first injector element.

29. A bi-propellant injector comprising:
   a first injector element injecting a first propellant into a combustion chamber;
   a second injector element injecting a second propellant into said combustion chamber; and
   a flame-holding zone igniter directly adjacent to said second injector element and igniting recirculation of at least a portion of said first propellant and at least a portion of said second propellant within a flame-holding zone of the bi-propellant injector.

30. An injector as in claim 29 wherein said flame-holding zone igniter in igniting recirculation of said first propellant and said second propellant within said flame-holding zone ignites recirculation of said first propellant and said second propellant at a tip of said first injector element.

31. An injector as in claim 29 wherein said flame-holding zone igniter is a combustion wave ignition system that has at least one ignited propellant and directs a combustion wave at and ignites said first propellant and said second propellant in said flame-holding zone.

32. An injector as in claim 31 wherein said combustion wave ignition system comprises at least one combustive wave tube with an injector end that is proximate to an oxidizer tip of said first injector element and ignites at least a portion of said first propellant and at least a portion of said second propellant within said flame-holding zone.

* * * * *